350-332 SR

PM052 XR 4,227,193

United States Patent [19]

Shanks

[11] 4,227,193

[45] Oct. 7, 1980

[54] METHOD AND APPARATUS FOR MATRIX ADDRESSING OPTO-ELECTRIC DISPLAYS

[75] Inventor: Ian A. Shanks, Malvern, England

[73] Assignee: National Research Development Corporation, London, England

[21] Appl. No.: 927,823

[22] Filed: Jul. 25, 1978

[30] Foreign Application Priority Data

Jul. 26, 1977 [GB] United Kingdom ............... 31399/77

[51] Int. Cl.[2] .............................................. G06F 3/14

[52] U.S. Cl. .................................... 340/784; 340/754; 340/811

[58] Field of Search ............... 340/753, 754, 784, 802, 340/805, 811

[56] References Cited

U.S. PATENT DOCUMENTS

| | | | |
|---|---|---|---|
| 4,079,369 | 3/1978 | Fukumoto | 340/753 |
| 4,085,352 | 4/1978 | Hilton | 340/754 |
| 4,087,807 | 5/1978 | Miller | 340/802 |
| 4,109,241 | 8/1978 | Shanks | 340/811 |
| 4,119,367 | 10/1978 | Raynes et al. | 340/784 |
| 4,127,848 | 11/1978 | Shanks | 340/784 |

*Primary Examiner*—Marshall M. Curtis
*Attorney, Agent, or Firm*—Cushman, Darby & Cushman

[57] ABSTRACT

A matrix display including an electro-optic display having a layer of display material contained between two spaced substrates carrying m X and n Y electrodes arranged in an array to provide an m x n element matrix. A first series of m different coded waveforms are applied one to each X electrodes simultaneously and a second series of coded waveforms are applied simultaneously to the Y electrode. This second series of waveforms has codes different from one another and from the first series of waveforms. Additionally each code in the second series is related both to the codes on the X electrodes and to the information required to be displayed at each element along its associated Y electrode. As a result selected elements receive an r.m.s. voltage below a display effect threshold while others receive an r.m.s. voltage above threshold to collectively display the required information. The codes may be two or more level codes. Two level codes, binary codes, may be pseudo random series or orderly binary codes. The electro optic display may be a liquid crystal or an electroluminescent display.

13 Claims, 4 Drawing Figures

METHOD AND APPARATUS FOR MATRIX ADDRESSING OPTO-ELECTRIC DISPLAYS

This invention relates to opto electric displays in which selected parts of the display are addressed in matrix form, the displays may be liquid crystal displays, or a.c. electroluminescent displays.

Liquid crystal displays are commonly formed by enclosing a thin layer e.g. 12 μm thick, between glass slides provided on their inner faces wth transparent electrodes. Application of a voltage to the electrodes causes a change in optical properties in the liquid crystal between the electrodes, removal of the voltage allows the liquid crystal to relax back to its original state. Thus for example a part of a display can be made to appear transparent in a colored or black background, or vice versa, and this is usefully used in digital watch displays. For simple displays such as small numeric watch displays only a relatively few electrodes are required. However for a larger display it becomes impractical to provide an individual pair of electrodes to each part of the display requiring addressing.

One solution to the addressing of large displays commonly used in electro-optic displays is to address in a matrix, i.e. use a series of long column electrodes on one of the glass slides and a series of long row electrodes on the other glass slide. Thus by applying a voltage to a particular column and a row electrode liquid crystal between the intersection of those two electrodes is addressed. A similar technique may also be used to multiplex the addressing of seven segment type digital displays, or matrix displays when the electrodes are arranged in radial and curved form to provide a polar co-ordinate display.

Unfortunately the time required for a liquid crystal to change its optical property on appllication of an electrical voltage i.e. into its 'on' state, and the time required to relax back to its original 'off' state after removal of the voltage is frequently incompatible with matrix addressing or multiplexing. This is because the whole display cannot be addressed before the first addressed parts of the display decay back to their non-addressed state.

Another type of electro-optic display that can be addressed in matrix form is the a.c. electroluminescent display in which the application of a voltage across a phosphor layer causes light emission.

A problem common to matrix addressing is that the intersections not required to display information must receive voltages suitably different from the intersections required to show information. This problem is eased if the information required to be displayed is in the form of a single valued trace e.g. a sinusoidal waveform. In this case each row and column electrode can be addressed simultaneously with its appropriate waveform. However for a 128×128 element display this requires at least 128 different waveforms. In the invention described in U.S. Pat. No. 4,127,848 a master waveform is divided into 128 waveforms whose minimum phase difference is $2\pi/128$. Alternatively a poly-frequency (e.g. 128 different frequencies) or poly-pulse width (e.g. 128 different pulse widths) system may be used. The complexity of electronics for such a number of waveforms is considerable.

As used herein a matrix display is defined as a display having a set of n electrodes and a set of m electrodes forming n×m intersections or elements whereby information to be displayed is obtained by altering the optical property of the display at a desired number of intersections, the change in optical property being achieved by application of appropriate voltage waveforms to the two sets of electrodes.

As used herein a threshold voltage is that voltage above which a desired observable optical effect occurs, e.g. liquid crystal becomes clear from a scattering state of transparent from an opaque state or vice versa.

According to this invention a method of addressing a matrix display includes the steps of generating a series of waveforms of different shapes over a period T, applying these waveforms to two sets of electrodes simultaneously so that at selected electrode intersections an RMS voltage is below a display threshold value and at other electrode intersections is above threshold value.

The waveforms may be two or more level and arranged to provide a net a.c. value across the electrode intersections. Two level codes may be binary codes of logic zeros and ones of period T with the waveform of one period followed (if necessary) by its complement e.g. a voltage series of zero and +V followed by zero and −V to provide a net a.c. waveform.

According to this invention a display apparatus comprises an opto electric display cell having a first and a second set of electrodes arranged in a matrix form, means for generating a plurality of waveforms of different shapes over a period T, means for applying a different waveform from the plurality of waveforms to each electrode in the first set of electrodes, means for selecting waveforms from the plurality of waveforms in accordance with a desired pattern of display and applying these selected waveforms to the second set of electrodes, contemporaneously with the application of waveforms to the first set of electrodes, the arrangement being such selected intersections receive an RMS voltage value below the display cell threshold and the remaining intersections receive an RMS voltage value above the threshold value to collectively display desired information. The waveforms may be two or more level coded waveforms.

The waveforms may be of period T divided into L bits and $2^N$ waveforms out of a possible $2^L$ waveforms used with L>N and arranged so that the Hamming difference Δ between each of the $2^N$ waveforms is equal to or above a predetermined value. Each bit of the waveform has a logical value of one or zero with a logic one having a voltage $V_1$ and logic zero voltage $V_2$. The waveforms may be a part of an ordered series of binary numbers of pseudo random codes.

The means for generating a plurality of waveforms may be a programmed memory e.g. a read only memory (ROM) or a binary code generator such as a binary counter whose outputs are in the form of logic zero and ones for different waveforms for each binary number generated.

The electro-optic matrix display may be a liquid crystal display, an a.c. electroluminescent display, or a plasma arc display. The liquid crystal display may use the so-called twisted nematic or or Schadt & Helfrich cell in which a thin e.g. 12 μm thick, layer of nematic liquid crystal material is contained between two glass plates unidirectionally rubbed to align liquid crystal molecules and arranged with the rubbing directions orthogonal. This results in a twisted molecular structure which rotates the electric field vector of plane polarised light in the absence of an electric field and, when a voltage above a threshold $V_c$, typically 3 volts, for a 12

μm thick layer, is applied ceases to rotate plane polarised light. The cell is placed between polarizers with their optical axes parallel or crossed so that light transmission or extinction is obtained by switching the voltage on or off or vice versa. Small amounts. e.g. 1% of a cholesteric material may be added to the liquid crystal material, also small amounts of dichroic or pleochroic dye may be added when one polariser may be dispensed with. Alternatively the liquid crystal display may operate using the phase change effect in which a thin, e.g. 12 μm thick, layer of a cholesteric material changes from its light scattering focal conic cholesteric 'off' state or a nematic, light transmissive 'on' state on application of a voltage above a threshold value e.g. 10 volts for a 12 μm thick layer. Dichroic dye may be added to the liquid crystal material to enhance contrast between the two states.

When a twisted nematic liquid crystal display is used the polarizers may be colored differently in different parts of the display. For example the polarizer may be in stripes of different colors each strip being in register with a strip electrode. Such polarizers may be as described in U.K. Patent Application No. 52,123/74, U.S. Ser. No. 636,786 and in which a thin layer of stretched polypropylene membrane material e.g. Celgard (Trade Mark) has incorporated therein a liquid crystal material and dichroic dye mixture. The liquid crystal may be incorporated by e.g. a silk screen printing process, on selected areas of the Celgard layer. When different electrodes are associated with different colors e.g. alternate red and green stripes, dual color displays are more readily observed.

The a.c. electroluminescent display comprises a layer of electroluminescent phosphor material contained between glass plates bearing strip electrodes. This phosphor material may be obtained in a known manner as follows; an admixture is formed of particles of a compound or compounds of an element of group II with an element of group VIb (e.g. zinc sulphide) and an activator such as copper and a co-activator such as chlorine. These particles are then embedded in a translucent binding matrix (e.g. polymethylmethacrylate) to form a layer.

The invention will now be described by way of example only with reference to the accompanying drawings of which:

Figure 2:
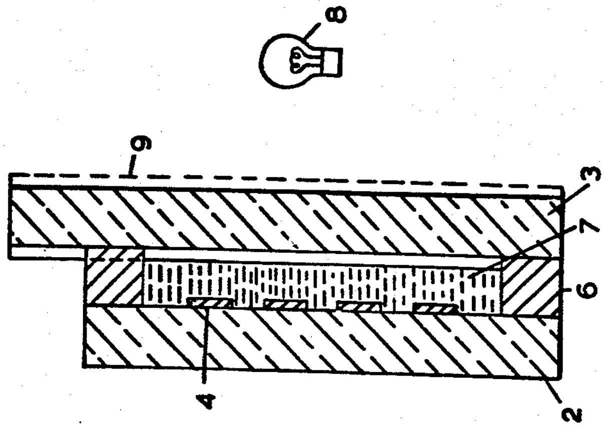
FIG. 2 is a sectional side view of FIG. 1.
Figure 1:
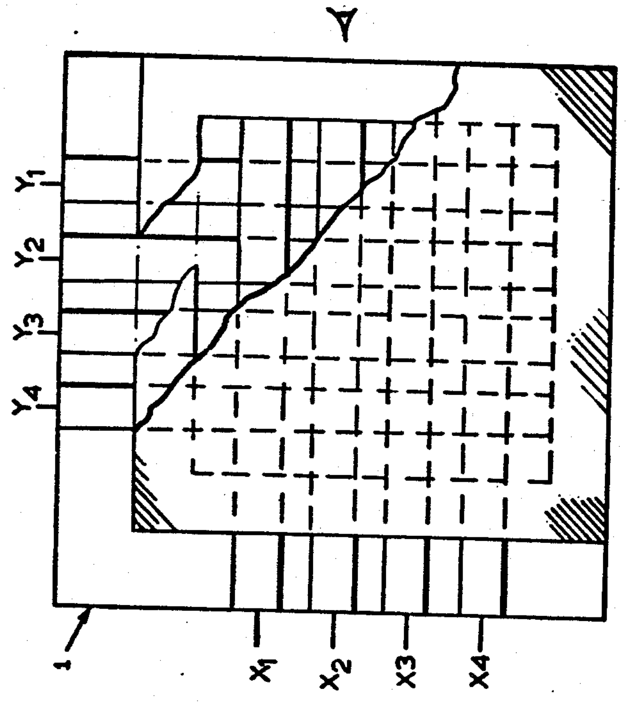
FIG. 1 is a view of a liquid crystal display arranged in cartesian matrix form.

FIGS. 1, 2 show a liquid crystal display having a 4×4 element display 1. It comprises two glass plates, 23 carrying spaced strip electrodes 4, 5 arranged in XY matrix form. These strips are of tin oxide or indium oxide typically 1,000 Å thick and in a larger display e.g. 126×126 elements would be about 600 μm wide spaced 500 μm apart. To obtain the strips 4, 5 the plates 2, 3 are coated with tin oxide e.g. by sputtering and then etched through photolithographic masks in a conventional manner. A spacer ring 6 maintains the plates 2, 3 about 12 μm apart. An epoxy resin glue fixes the assembly together. Between the plates 2, 3 is a liquid crystal material 7 the composition of which depends upon the type of liquid crystal effect to be used, i.e. the twisted nematic or phase change or other known effect.

The display 1 may be observed by light transmission using natural or an electric light 8 behind the display or by projecting an image of the display 1 onto a magnifying lens or a reflecting screen. Alternatively a reflector 9 may be placed against the outer surface of plate 3 (or the surface silvered) and the display observed by reflected light.

With below threshold volts $V_c$ applied across an XY intersection that intersection is light scattering or appears colored or dark when a pleochroic dye is used. With a voltage of about 1.4 $V_c$ RMS across an intersection that intersection appears clear or the color of a back light or reflector. Threshold voltage, $V_c$, is about 1 volt for twisted nematic or 5 volts for a typical phase change cell and thus the root mean square voltage $V_{RMS}$ is typically about 1.4 volts or 7 volts respectively.

Suitable materials are:
twisted nematic effect
99.8% by weight 4, 4' n-pentyl-cyanobiphenyl
0.2% by weight cholesteryl nonanoate
phase change effect
95% by weight of 5 cyanobiphenyl
5% by weight of cholesteryl nonanoate.

Up to about 1% of a dye material may be added to the liquid crystal material for example:

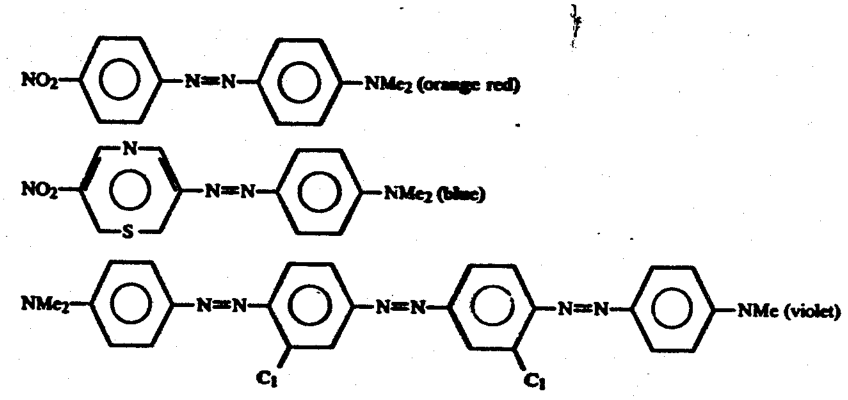

A layer of 7 liquid crystal material responds to the RMS value of an alternating field applied across it. Thus when the field is applied by a binary coded waveform, i.e. logic ones and zeros in a given order, the waveform period must be less than the time required for the liquid crystal to respond to instantaneous values of the waveform. When two different waveforms are applied to XY electrodes 4, 5, the liquid crystal 7 at the XY intersection responds to the difference of those two waveforms.

As already noted liquid crystal materials exhibit an observable effect when a voltage above and below a threshold value $V_c$ is applied. The waveforms applied to each X and Y electrode are therefore chosen so that each XY intersection receives the appropriate RMS voltage dependent on the desired state of that XY intersection.

Figure 3:
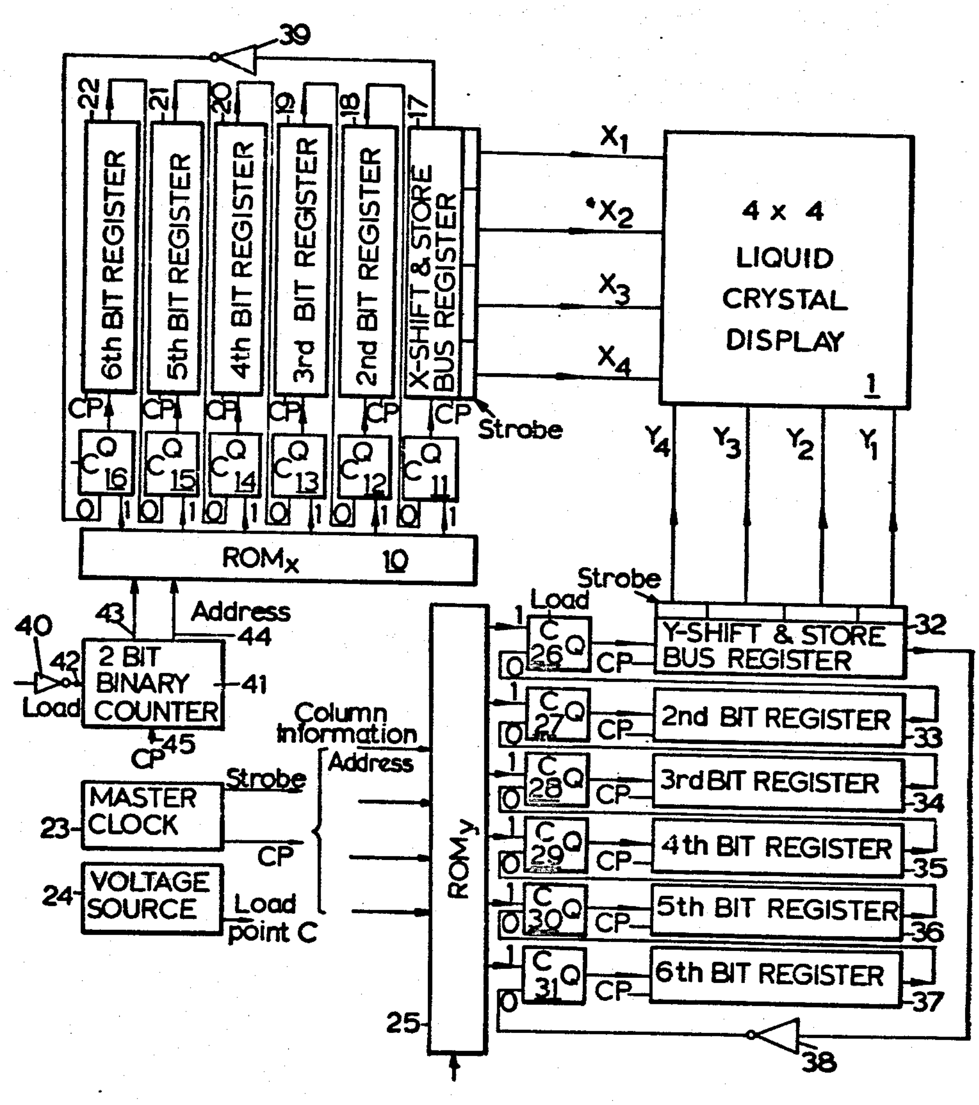
FIG. 3 is a circuit diagram for addressing a 4×4 matrix display.

The 4×4 display of FIG. 3 may have the following values of binary codes applied to its XY electrodes.

Let the waveforms be $A_1 A_2 A_3 \ldots A_i \ldots A_N$ $B_1 B_2 B_3 \ldots B_i \ldots B_N$ $A_i = 1$ or 0

$B_i = 1$ or 0

N = number of bits in word code

Δ = Hamming distance between the two binary words.

Hamming distance $$\Delta = \sum_{i=1}^{N} (A_i \oplus B_i)$$

[⊕ implies "exclusive 'OR'"]

The RMS value at an intersection $V_{RMS} = V_{applied}\sqrt{\Delta/N}$

Assuming a Hamming distance Δ of 2 gives a below threshold voltage and that one of 4 gives an above threshold voltage then waveforms could be applied as follows to the X, row electrodes

TABLE 1

| | | | |
|---|---|---|---|
| $X_1$ | 000011 | then its complement | 111100 |
| $X_2$ | 000101 | " | 111010 |
| $X_3$ | 001001 | " | 110110 |
| $X_4$ | 010001 | " | 101110 |

The logic one represents a voltage value $V_1$ and a logic zero represents a voltage value $V_2$ which may be zero. A waveform is followed by its complement to give a net a.c. field at an intersection.

If column $Y_1$ is now considered then for the on and off states represented by 1 and 0 the waveforms applied to the Y-column electrode may be as follows.

TABLE 2

| Required state at intersection | | | | Waveform required on $Y_1$ | | |
|---|---|---|---|---|---|---|
| $X_4Y_1$ | $X_3Y_1$ | $X_2Y_1$ | $X_1Y_1$ | | | |
| 0 | 0 | 0 | 0 | 000000 | then its complement | 111111 |
| 0 | 0 | 0 | 1 | 011101 | | 100010 |
| 0 | 0 | 1 | 0 | 011011 | | 100100 |
| 0 | 0 | 1 | 1 | 011000 | | 100111 |
| 0 | 1 | 0 | 0 | 010111 | | 101000 |
| 0 | 1 | 0 | 1 | 001010 | | 110101 |
| 0 | 1 | 1 | 0 | 010010 | | 101101 |
| 0 | 1 | 1 | 1 | 110000 | | 001111 |
| 1 | 0 | 0 | 0 | 001111 | | 110000 |
| 1 | 0 | 0 | 1 | 001100 | | 110011 |
| 1 | 0 | 1 | 0 | 001010 | | 110101 |
| 1 | 0 | 1 | 1 | 101000 | | 010111 |
| 1 | 1 | 0 | 0 | 000110 | | 111001 |
| 1 | 1 | 0 | 1 | 100100 | | 011011 |
| 1 | 1 | 1 | 0 | 100010 | | 011101 |
| 1 | 1 | 1 | 1 | 011110 | | 100001 |

The value of Δ can be checked as follows:

At intersection $X_1Y_1$ only in an on state $X_1$ code 000011

$Y_1$ code 011101

Δ = 011110 = 4 i.e. on state

At interesection $X_2Y_1$ (with $X_1Y_1$ only in on state $X_2$ code 000101

$Y_1$ code 011101

Δ = 011000 = 2 i.e. off state

The waveform applied to $Y_1$ does not affect the inte sections in columns $Y_2$, $Y_3$, $Y_4$ and therefore the san set of codes can be applied to $Y_2$, $Y_3$, $Y_4$ at the same tin to obtain any pattern of on and off state in the $X_1$, X $X_3$, $X_4$ rows shown above for column $Y_1$. This can l extended to any number of column electrodes witho increasing the number of row waveforms require From the above it can be seen that the number of wav forms required for the columns is $2^R$ where R is tl number of rows. (The roles of the row and colum electrodes can of course be interchanged.) Thus a lir of alpha numeric characters having a seven by fiv matrix per character requires seven row electrodes an hence 128 different column codes and seven row code irrespective of the number of characters per row.

Values of the Hamming difference other than 2 and may be used e.g. 3 and 5. It is not necessary that o elements have the same Δ but merely that it must b greater than a minimum value. This is because, whe viewed at normal incidence, the variation in the 'o state voltage is not apparent for voltages above a certai value. For some displays however, e.g. twisted nemati displays, it is preferable that each 'on' element has th same Δ otherwise the display appears patchy whe viewed at angles well away from the normal to th display.

When pseudo random codes are used there may be n need to follow each waveform with complement sinc pseudo random codes can give an inherently a.c. volt age difference.

The circuit diagram of FIG. 3 comprises a 4×4 ele ment liquid crystal display 1 constructed as shown i FIGS. 1, 2.

Waveforms for application to row, X electrodes ar generated by a read only memory $ROM_x$ 10 having si outputs $Q_0$–$Q_5$ which collectively provide 6-bit binar members. Each output $Q_0$–$Q_5$ respectively connect through 2:1 multiplexers 11 to 16 to a serial-in/serial-ou shift register 17 to 22 of which register 17 is a shift an store bus X register with parallel outputs to the row electrodes $X_1$–$X_4$. The registers 17–22 are respectivel connected head to tail through the multiplexers with a inverter 39 between the X shift register 17 and the 6tl bit register 22. A master clock 23 supplies clock pulse cp to the $ROM_x$ address counter 41 at 45 and each shif register 17 to 22. Load pulses are applied from a voltag source 24 to the $ROM_x$ address counter reset termina via inverter 40 and to each 2:1 multiplexer 11 to 16. Th master clock 25 supplies strobe pulses at a frequency o cp/4.

Waveforms for application to the column, Y elec trodes are generated by a $ROM_y$ 25 having six output $Q_0$–$Q_5$ which collectively provide 6-bit binary numbers Each output $Q_0$ to $Q_5$ is connected through 2:1 multi plexers 26 to 31 to serial-in/serial-out shift registers 3 to 37. The shift register 32 is a shift and store bus Y register with 4 parallel outputs to the column Y elec trodes. The shift registers 32 to 37 are respectivel connected head to tail through the multiplexers 26 to 3 with an inverter 38 between the Y shift register 32 an the 6th bit shift register 37. Clock pulses cp can b applied to each register 32 to 37, strobe pulses to the Y register 32 and load pulses to each multiplexer 26 to 31.

In operation when a load pulse is applied to the $ROM_x$ address counter 41 and multiplexers 11 to 16 and clock pulses cp are applied to the $ROM_x$ address counter 41 and shift registers 17 to 22 then four 6-bit numbers, shown in Table 1, are entered into the shift registers 17 to 22. The load pulse is then removed and $ROM_x$ address counter 41 is reset. Clock pulses cp shift these 6-bit numbers along the registers 17 to 22 now connected head to tail through multiplexers 11 to 16 and strobe pulses each 4th clock pulse enter the X register state into the row X electrodes so that each row receives logic ones and zero as detailed in Table 1. After receiving 6-bits each row electrode receives the complement of the waveform as the inverter 39 inverts the registers 17 to 22 contents once per complete recycle. This process repeats until the registers are reloaded.

Meanwhile as the $ROM_x$ is entering 6-bit numbers into the registers 17 to 21 the $ROM_y$ is synchronously entering 6-bit numbers through the multiplexers 26 to 31 into the shift registers 32 to 37. This is caused by the application of a load pulse, of length 4 cp, to multiplexers 26 to 31 and clock pulses cp to the shift registers 32 to 37. The information used to address the $ROM_y$ is the desired state of each intersection in each column of the display. Thus one of the 4-bit numbers shown in the left hand column of Table 2 is clocked into the $ROM_y$ address leads at each of the four clock pulses and the $ROM_y$ outputs the corresponding 6-bit number shown in the right hand column of Table 2. When the registers are full the load pulse is removed. Clock pulses cp recirculate the logic ones and zeros in the registers 32 to 37 now connected head to tail through multiplexers 26 to 31 whilst strobe pulses are applied to the Y register once per four clock pulses. The information in the registers 32 to 37 is inverted every complete re-cycle by inverter 38. As a result waveforms selected from those shown in the right hand column in Table 2 are applied to the Y electrodes of the display 1. This results in a desired number of elements bein in an 'on' state with the remainder in an 'off' state to collectively form the required display. The above is repeated until fresh information is to be displayed. To change the display a new loud pulse is generated and fresh instructions are fed into the $ROM_y$ and the process repeated.

Figure 4:
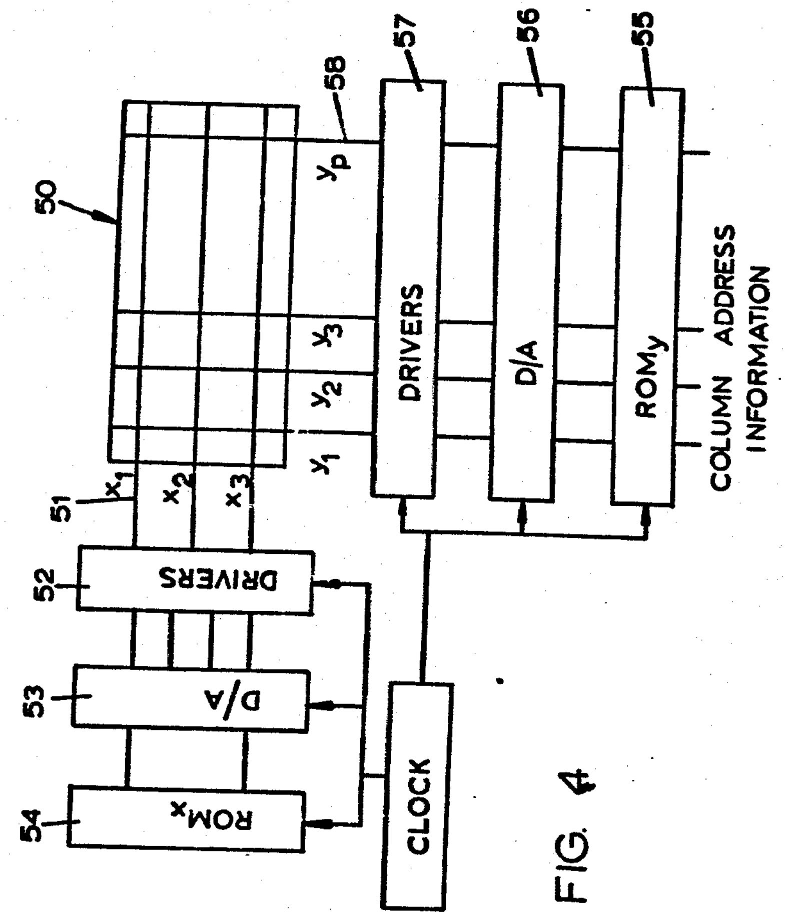
FIG. 4 is a circuit diagram for addressing a 4 row by 'p' column display.

FIG. 4 shows a three row by 'p' column display 50 in which a seven level coded waveform is used. The voltage levels are in equal steps and may have positive, negative and zero levels. Row voltages are supplied to X row electrodes 51 from drivers 52 supplied with the necessary voltage levels by a digital to analogue (D/A) converters 53 themselves supplied with digital words from a read only memory ($ROM_X$) 54. Similarly column address information is supplied to a read only memory $ROM_Y$ 55 which outputs binary words, relating the desired column information and the codes on the X row electrodes. The $ROM_Y$ 55 output is converted into the required different voltage levels in a column digital to analogue converters 56 and fed into column drivers 57 which outputs waveforms into column Y, electrodes 58. Clock pulses are applied from a clock 58.

Any number of X, Y intersections can be turned ON (or OFF) as desired by waveforms as shown below:

TABLE 3

| | Row waveform | | | | | |
|---|---|---|---|---|---|---|
| Clock pulse | 0 | 1 | 2 | 3 | 4 | 5 |
| $X_1$ | 0 | 1 | 2 | 0 | −1 | −2 |
| $X_2$ | 1 | 2 | 0 | −1 | −2 | 0 |
| $X_3$ | 2 | 0 | 1 | −2 | 0 | −1 |

TABLE 3-continued

TABLE 4 / TABLE 5

| Column Information | | | | Column Waveforms | | | | | |
|---|---|---|---|---|---|---|---|---|---|
| $X_1$ | $X_2$ | $X_3$ | Clock Pulse | 0 | 1 | 2 | 3 | 4 | 5 |
| 0 | 0 | 0 | | 1 | 1 | 1 | −1 | −1 | −1 |
| 0 | 0 | 1 | | 0 | 2 | 1 | 0 | −2 | −1 |
| 0 | 1 | 0 | | 1 | 0 | 2 | −1 | 0 | −2 |
| 0 | 1 | 1 | | 0 | 0 | 3 | 0 | 0 | −3 |
| 1 | 0 | 0 | | 2 | 1 | 0 | −2 | −1 | 0 |
| 1 | 0 | 1 | | 0 | 3 | 0 | 0 | −3 | 0 |
| 1 | 1 | 0 | | 3 | 0 | 0 | −3 | 0 | 0 |
| 1 | 1 | 1 | | 3 | 3 | 3 | −3 | −3 | −3 |

0 represents OFF state
1 represents ON state

0 = 0 volts
1 = V volts
2 = 2V volts
3 = 3V volts

Note all waveforms are followed by their complement to provioe a net A.C. voltage across an X, Y intersection.
With the above waveforms
voltage at OFF intersection $$V_{OFF}(\text{RMS}) = \frac{2V}{\sqrt{6}} = V_c \text{ (liquid crystal threshold voltage)}$$

voltage at ON intersection $V_{ON}(\text{RMS}) \geqq \frac{4V}{\sqrt{6}} \geqq 2V_c$ $$\text{Ratio } \frac{V_{ON}}{V_{OFF}} (\text{RMS}) \geqq 2.$$

I claim:

1. A display apparatus comprising:
(1) An electro optic display having a layer of display material between two dielectric substrates, a first series of m electrodes on one substrate and a second series of n electrodes on the other substrate arranged to define a matrix of m×n elements across which electric signals may be applied to cause an observable display effect;
(ii) means for generating a first series of m different reference electrical waveforms, means for applying a different one of the m different waveforms simultaneously to each electrode in the first series of electrodes;
(iii) means for generating a second series of electrical waveforms different from one another and from each of the first series of waveforms;
(iv) means for selecting waveforms from the second series of waveforms for application to each electrode in the second series of electrodes, the selected waveform being related to the waveforms on the first series of electrodes and to the desired information to be displayed at each element associated with each electrode in the second series of electrodes;
(v) means for applying the selected waveforms simultaneously to the second series of electrodes concurrently with the waveforms applied to the first series of electrodes;
(vi) whereby an rms voltage less than a display effect threshold voltage is maintained across selected elements and an rms voltage greater than the display effect threshold is maintained across the remaining elements to collectively display the desired information.

2. A display according to claim 1 wherein the means for generating the first series and the second series of electrical waveforms generate binary coded waveforms.

3. A display according to claim 2 wherein the binary coded waveforms are pseudo random coded waveforms.

4. A display according to claim 2 wherein the means for generating the first series and the second series of waveforms are programmed memories.

5. A display according to claim 2 wherein the means for generating the first series and the second series of waveforms are binary code generators.

6. A display according to claim 2 wherein the means for generating the second series of waveforms and the means for selecting waveforms comprise a programmed memory.

7. A display according to claim 2 wherein the means for applying waveforms to the second series of electrodes includes means for storing the selected waveforms.

8. A display according to claim 2 wherein the means for applying waveforms to the first series of electrodes includes means for storing the m different waveforms.

9. A display according to claim 7 wherein the storing means is a plurality of shift registers.

10. A display according to claim 2 wherein the means for applying waveforms to the electrodes comprises shift and store bus registers.

11. A display according to claim 1 wherein the electro optic display is a liquid crystal display and the display material is a layer of liquid crystal material.

12. A display according to claim 1 wherein the electro optic display is an electroluminescent display and the display material is a layer of electroluminescent material.

13. A display according to claim 11 further comprising a reflective layer arranged behind the liquid crystal display whereby the displayed information is observed by reflection.

* * * * *